United States Patent
Kang et al.

(10) Patent No.: US 9,558,587 B2
(45) Date of Patent: Jan. 31, 2017

(54) METHOD AND APPARATUS FOR CREATING MODEL OF PATIENT SPECIFIED TARGET ORGAN

(71) Applicant: Samsung Electronics Co., Ltd., Suwon-si (KR)

(72) Inventors: Na Hyup Kang, Seoul (KR); Tae Hyun Rhee, Yongin-si (KR); Kyung Hwan Kim, Yongin-si (KR); Do Kyoon Kim, Seongnam-si (KR); Sang Wook Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 833 days.

(21) Appl. No.: 13/907,072

(22) Filed: May 31, 2013

(65) Prior Publication Data

US 2014/0015833 A1 Jan. 16, 2014

(30) Foreign Application Priority Data

Jul. 10, 2012 (KR) ........................ 10-2012-0074927

(51) Int. Cl.
*G06T 17/00* (2006.01)
*G06T 17/20* (2006.01)

(52) U.S. Cl.
CPC ............... *G06T 17/00* (2013.01); *G06T 17/20* (2013.01)

(58) Field of Classification Search
None
See application file for complete search history.

(56) References Cited

U.S. PATENT DOCUMENTS

| 5,947,899 A | 9/1999 | Winslow et al. |
| 2002/0183992 A1 | 12/2002 | Ayache et al. |
| 2004/0043368 A1 | 3/2004 | Hsieh et al. |
| 2006/0149522 A1 | 7/2006 | Tang |
| 2008/0262814 A1 | 10/2008 | Zheng et al. |
| 2010/0280352 A1 | 11/2010 | Ionasec et al. |
| 2011/0236868 A1 | 9/2011 | Bronstein et al. |

FOREIGN PATENT DOCUMENTS

| JP | 2005-329099 | 12/2005 |
| JP | 2009-011628 | 1/2009 |
| JP | 2011-138350 | 7/2011 |

(Continued)

OTHER PUBLICATIONS

Benameur et al. (3D/2D registration and segmentation of scoliotic vertebrae using statistical models, vol. 27, issue 5, Sep.-Oct. 2003, pp. 321-337, Elsevier).*

(Continued)

*Primary Examiner* — Kyle Zhai
(74) *Attorney, Agent, or Firm* — NSIP Law

(57) ABSTRACT

Provided is an apparatus and method to create a model of a target organ of a patient. The apparatus and method generate a deformation matrix between at least two shape models of a target organ based on at least two three-dimensional (3D) images of the target organ. The apparatus and method also extract constraints about the target organ from a two-dimensional (2D) image of the target organ. The apparatus and method create the model of the target organ based on the constraints and the deformation matrix.

25 Claims, 10 Drawing Sheets

(56) References Cited

FOREIGN PATENT DOCUMENTS

KR  10-2011-0103178  9/2001
KR  10-2009-0078487  7/2009
KR  10-2011-0058903  6/2011

OTHER PUBLICATIONS

Pommert et al. (Creating a high-resolution spatial/symbolic model of the inner organs based on the Visible Human, Medical image analysis 5, 2001, pp. 221-228).*
Bro-Nielsen (Finite Element Modeling in Surgery Simulation, IEEE, pp. 490-503, Mar 1998).*
Ip et al. (Constructing a 3D individualized head model from two orthogonal views, May 1996, vol. 12, Issue 5, pp. 254-266, The visual computer).*

* cited by examiner

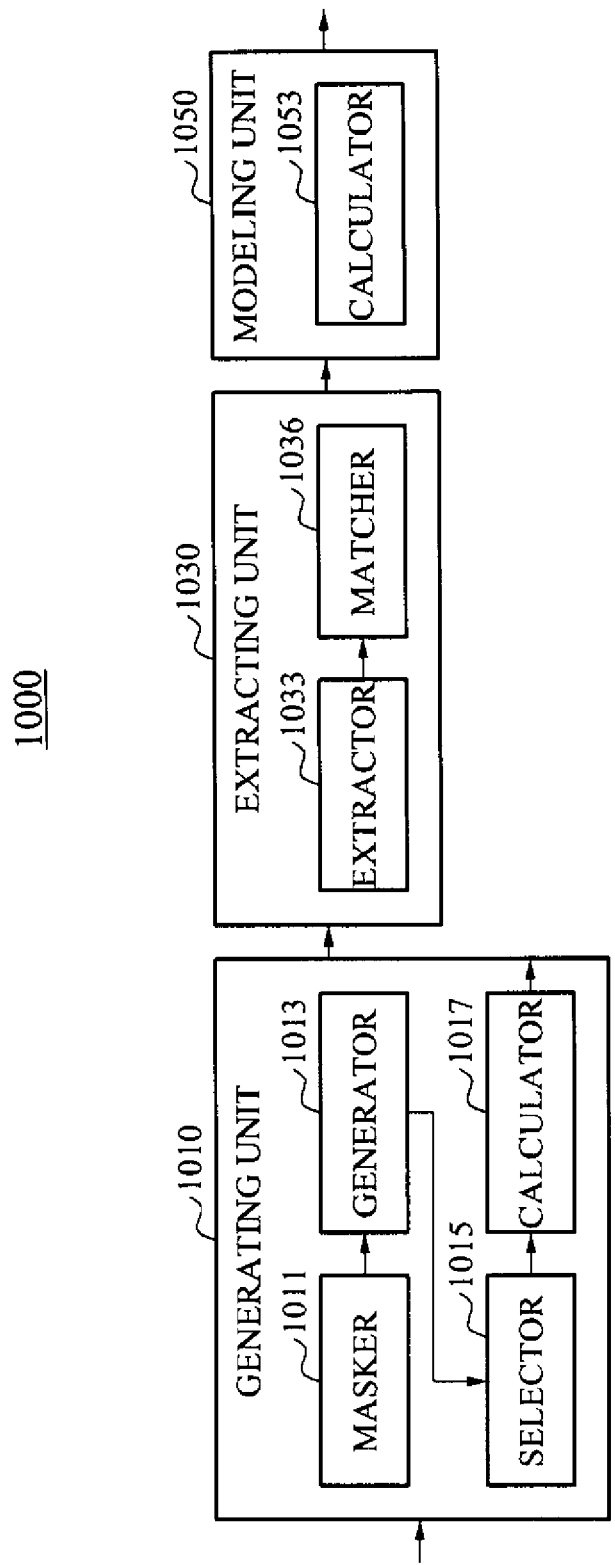

METHOD AND APPARATUS FOR CREATING MODEL OF PATIENT SPECIFIED TARGET ORGAN

CROSS-REFERENCE TO RELATED APPLICATION(S)

This application claims the benefit under 35 U.S.C. §119(a) of Korean Patent Application No. 10-2012-0074927, filed on Jul. 10, 2012, in the Korean Intellectual Property Office, the entire disclosure of which is incorporated herein by reference for all purposes.

BACKGROUND

1. Field

The following description relates to a method and apparatus to create a model of a target organ specified for a patient.

2. Description of Related Art

In general, human organs have a non-rigid deformation characteristic. In particular, shapes of cardiothoracic and abdominal organs, for example, liver, heart, lungs, and the like may be deformed due to external stimulus applied when breathing and performing laparotomy. Accordingly, modeling an organ deformation may be utilized in various medical fields to enable, for example, navigating inside of a patient in the case of performing clinical surgery, a preoperative plan, a surgery simulation, support in the case of performing actual surgery, and the like.

The organ deformation may show distinguishing characteristics for each patient. Accordingly, systems to model a patient specified organ deformation is important.

However, in an actual clinical environment, surgery generally proceeds based on poor quality medical images that are captured from medical imaging devices in real time. Accordingly, without tracking organ deformation in real time and based on good quality medical images, it may be difficult to appropriately perform a treatment process and make an appropriate clinical determination.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In accordance with an illustrative configuration, there is provided a method of creating a model of a target organ of a patient. The method includes generating a deformation matrix between two shape models of the target organ based on two three-dimensional (3D) images of the target organ; extracting constraints about the target organ from a two-dimensional (2D) image of the target organ; and creating the model of the target organ based on the constraints and the deformation matrix.

The generating includes masking an area of the target organ in the two 3D images; and creating the two shape models of the target organ using the masked area of the target organ.

The generating includes selecting a reference shape model from the two shape models; and calculating the deformation matrix based on a deformation relationship between the reference shape model and a remaining shape model.

The deformation relationship is calculated based on a deformation gradient corresponding to each of the reference shape model and the remaining shape model.

The method also includes decomposing the deformation gradient into a rotation component and a stretching component through a polar decomposition.

The method further includes performing nonlinear interpolation of the rotation component using a matrix exponential function.

The method includes adjusting a determinant of the stretching component to maintain a total sum of volumes that are depicted by the two shape models.

The method also includes configuring the two shape models to comprise a sub-structure of the target organ, and the sub-structure includes a blood vessel and a nerve.

The method also includes configuring a tetrahedral mesh model to comprise the two shape models. Each tetrahedron of the tetrahedral mesh model has a different deformation weight.

The extracting includes extracting a feature point from the 2D image of the target organ; and matching the feature point of the 2D image and a vertex comprised in the two 3D images of the target organ.

The matching includes identifying a number and a position of the vertex corresponding to the feature point of the 2D image from a reference shape model of the two shape models; and matching the feature point of the 2D image and the vertex based on the number and the position of the vertex.

The creating includes calculating a deformation gradient that is depicted by the feature point of the target organ based on the deformation matrix and the constraints.

The calculating includes calculating the deformation gradient with respect to remaining vertices excluding a vertex corresponding to the feature point of the target organ from vertices of the 2D image.

In accordance with an illustrative configuration, there is provided a non-transitory computer-readable medium including a program for instructing a computer to perform the method described above.

In accordance with another illustrative configuration, there is provided an apparatus for creating a model of a target organ of a patient. The apparatus includes a generating unit configured to generate a deformation matrix between two shape models of the target organ based on two three-dimensional (3D) images of the target organ; an extracting unit configured to extract constraints about the target organ from a two-dimensional (2D) image of the target organ; and a modeling unit configured to create the model of the target organ based on the constraints and the deformation matrix.

The generating unit includes a masker configured to mask an area of the target organ in the two 3D images; and a generator configured to create the two shape models of the target organ using the masked area of the target organ.

The generating unit includes a selector configured to select a reference shape model from the two shape models; and a calculator configured to calculate the deformation matrix based on a deformation relationship between the reference shape model and a remaining shape model.

The deformation relationship is calculated based on a deformation gradient corresponding to each of the reference shape model and the remaining shape model.

The apparatus also includes a decomposition unit configured to decompose the deformation gradient into a rotation component and a stretching component through a polar decomposition.

The apparatus includes an interpolation unit configured to perform nonlinear interpolation of the rotation component using a matrix exponential function.

The apparatus includes an adjustment unit configured to adjust a determinant of the stretching component in order to maintain a total sum of volumes that are depicted by the two shape models.

The two shape models comprise a sub-structure of the target organ, and the sub-structure includes a blood vessel and a nerve.

The two shape models are comprised in a tetrahedral mesh model, and each tetrahedron of the tetrahedral mesh model has a different deformation weight.

The extracting unit includes an extractor configured to extract a feature point from the 2D image of the target organ; and a matcher configured to match the feature point of the 2D image and a vertex comprised in the two 3D images of the target organ.

The matcher is configured to identify a number and a position of the vertex corresponding to the feature point of the 2D image from a reference shape model of the two shape models, and to match the feature point of the 2D image and the vertex based on the number and the position of the vertex.

The modeling unit includes a calculator configured to calculate a deformation gradient that is depicted by the feature point of the target organ based on the deformation matrix and the constraints.

The calculator is configured to calculate the deformation gradient with respect to remaining vertices, excluding a vertex corresponding to the feature point of the target organ from vertices of the 2D image.

Other features and aspects will be apparent from the following detailed description, the drawings, and the claims.

BRIEF DESCRIPTION OF THE DRAWINGS

FIG. 10 is a block diagram illustrating an example of an apparatus to create a model of a target organ, in accordance with an illustrative configuration.

Figure 1:
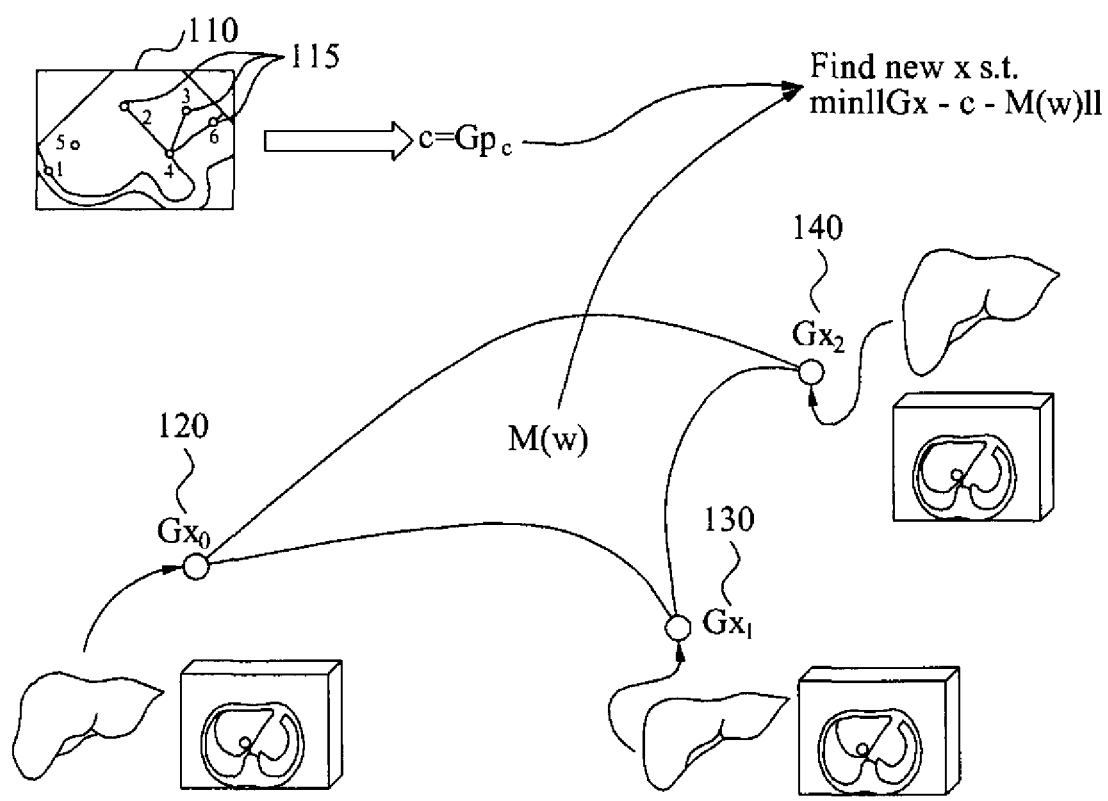
FIG. 1 is a diagram to describe a configuration to create a model of a target organ of a patient, in accordance with an illustrative example, in accordance with an illustrative configuration.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, description of well-known functions and constructions may be omitted for increased clarity and conciseness.

FIG. 1 is a diagram to describe a configuration to create a model of a target organ of a patient, in accordance with an illustrative example, in accordance with an illustrative configuration.

Referring to FIG. 1, a method and an apparatus configured to execute the method to create the model of the target organ, according to one illustrative example, includes a preprocessing process and a run-time processing process.

During the preprocessing process, a deformation matrix is generated between at least two shape models of the target organ of the patient based on at least two three-dimensional (3D) images of the target organ.

Referring to FIG. 1, during the preprocessing process, shape models $Gx_0$ 120, $Gx_1$ 130, and $Gx_2$ 140, which are based on a shape of the target organ, are created based on at least two 3D images of the target organ of the patient. A deformation matrix G, which defines a deformation space M(w) including the shape models $Gx_0$ 120, $Gx_1$ 130, and $Gx_2$ 140, is calculated.

In this example, the deformation matrix G refers to a matrix that defines the deformation space, and indicates a deformation gradient f when a vertex position relationship is given. A relationship between the deformation matrix G and the deformation gradient f is expressed by Equation 1:

$$f = Gx \quad \text{(Equation 1)}$$

In Equation 1, the deformation gradient f corresponds to a vector in which elements of a deformation gradient matrix $T_{ij}$ (shown in Equation 2) defined for each tetrahedron are aligned. Because the deformation gradient matrix $T_{ij}$ is a 3×3 matrix, the deformation matrix f may have a size of 9t×1.

Also, in Equation 1, x denotes a new vertex position in a 3v form and the deformation matrix G is matrix in a form of, for example, 9t×3v. Here, v denotes the number of vertices and t denotes the number of tetrahedrons on a tetrahedral mesh.

According to an embodiment, a deformation space is defined as reflecting information about an organ deformation specified for an individual patient. Therefore, even though only limited information about the organ deformation is provided, it is possible to create a model of a personalized target organ by maintaining a deformation characteristic specified for the patient.

According to an embodiment, the deformation gradient matrix $T_{ij}$ is decomposed into a rotation component $R_{ij}$ and a stretching component $S_{ij}$ through a polar decomposition as shown in Equation 2:

$$T_{ij} = R_{ij} S_{ij} \quad \text{(Equation 2)}$$

Linear interpolation of the stretching component $S_{ij}$ and nonlinear interpolation of the rotation component $R_{ij}$ are performed using a matrix exponential function and a logarithm, which is expressed by Equation 3:

$$T_j(w) = \exp\left(\sum_{i=1}^{l} w_i \log(R_{ij})\right) \cdot \sum_{i=1}^{l} w_i S_{ij} \quad \text{(Equation 3)}$$

In Equation 3, $T_j(w)$ denotes a $j^{th}$ tetrahedron of a tetrahedral mesh to be newly generated, $w_i$ denotes a weight of an $i^{th}$ tetrahedral mesh, and 1 denotes a total number of tetrahedral meshes.

Equation 3 may be utilized to interpolate the deformation gradient matrix $T_{ij}$ that is decomposed through the polar decomposition of Equation 2. A final interpolated deformation gradient matrix is generated by performing nonlinear interpolation of the rotation component $R_{ij}$ using a matrix logarithm, by performing linear interpolation of the stretching component $S_{ij}$, and by recombining the nonlinear interpolated rotation component $R_{ij}$ and the linear interpolated stretching component $S_{ij}$.

The definition of the deformation space M(w) and a relationship between the deformation space M(w) and the deformation matrix G will be further described with reference to FIG. 3.

According to an embodiment, when a deformation matrix is generated between shape models through the above preprocessing process, the following run-time processing process may be performed.

When feature points Pc 115 extracted from a new two-dimensional (2D) medical image 110 of the target organ of the patient are input, a model of the target organ specified for the patient (hereinafter, a patient specified target organ) may be created based on constraints c verified from the feature points Pc 115 and the deformation matrix G, which defines the deformation space M(w). The model of the patient specified target organ may be a deformed mesh model of the target organ.

In this example, the feature point Pc 115 indicates a characteristic point or vertex configured to distinguish the target organ of the patient from an organ of another user. For example, the feature point Pc 115 may be a position of wrinkle appearing between a right lobe and a left lobe of liver of the patient, a vertex at which major blood vessels, nerves, and the like in a corresponding organ, and the like.

The constraints c may indicate conditions that enable the corresponding organ to show a feature point of the target organ, and a deformation characteristic of the corresponding organ specified for the patient, such as volume maintainability of the organ and the like. The constraints c may satisfy $c = Gp_c$.

A process of modeling patient specified organ deformation in real time using a deformation matrix generated during the above preprocessing process and a new 2D medical image of the target organ of the patient may be referred to as a run-time processing process.

According to an embodiment, by defining a deformation space configured to express an organ deformation of a patient from a 3D medical image volume, such as a magnetic resonance imaging (MRI) image, a computed tomography (CT) image, and the like, patient specified organ deformation is provided with respect to a 2D medical image of a low resolution and a probability of medical utilization probability is enhanced.

Figure 2:
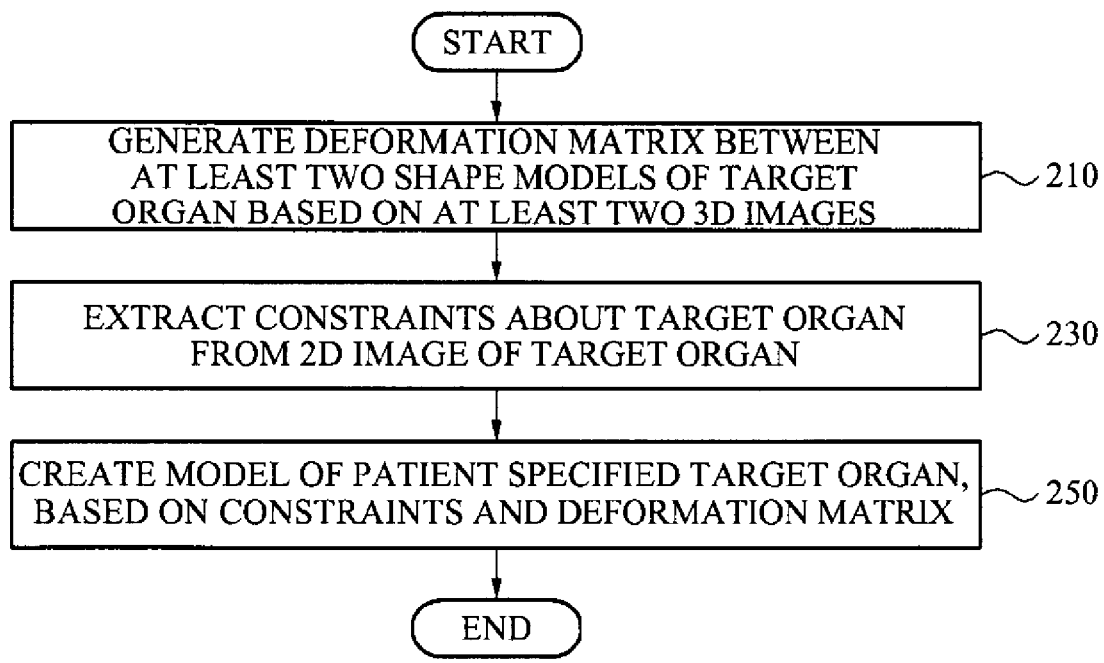
FIG. 2 is a flowchart illustrating an example of a method to create a model of a target organ, in accordance with an illustrative configuration.

FIG. 2 is a flowchart illustrating an example of a method to create a model of a target organ, in accordance with an illustrative configuration. The operations performed by the method of FIG. 2 may be configured to be performed by an apparatus (hereinafter, a creating apparatus).

Referring to FIG. 2, in 210, the method generates a deformation matrix between at least two shape models of the target organ of the patient based on at least two 3D images of the target organ. The creating apparatus executes the method to create at least two shape models based on a shape of the target organ using the at least two 3D images. The deformation matrix between the at least two shape models defines a deformation space including the at least two shape models.

In one configuration, the at least two shape models may exclude any sub-structure of the target organ, or, in alternative configuration, the at least two shape models may include at least one sub-structure of the target organ. The at least one sub-structure may include blood vessel, nerve, and the like. The at least two shape models may be included in a tetrahedral mesh model. Each of tetrahedrons that constitute the tetrahedral mesh model may have a different deformation weight.

In 230, the method extracts constraints about the target organ from a 2D image of the target organ.

In 250, the method creates a model of the target organ specified for the patient based on the constraints and the deformation matrix. The model of the patient specified target organ may be created using a nonlinear system according to Equation 4:

$$x^*, w^* = \operatorname*{argmin}_{x,w} \|Gx - (M(w) + c)\| \quad \text{(Equation 4)}$$

In Equation 4, x* denotes positions of new vertices, and w* denotes weights between organ models. In Equation 4, x* may be provided in a form of 3v×1, and w* may be provided in a form of 1×1.

Also, a deformation matrix G may be obtained by extracting a deformation gradient using a position vector x of a given vertex. A deformation space M may be obtained by performing nonlinear interpolation of deformation gradients of organ models with respect to an input vertex w. Also, the constraints c may be calculated using constraints input by a user.

Figure 3:
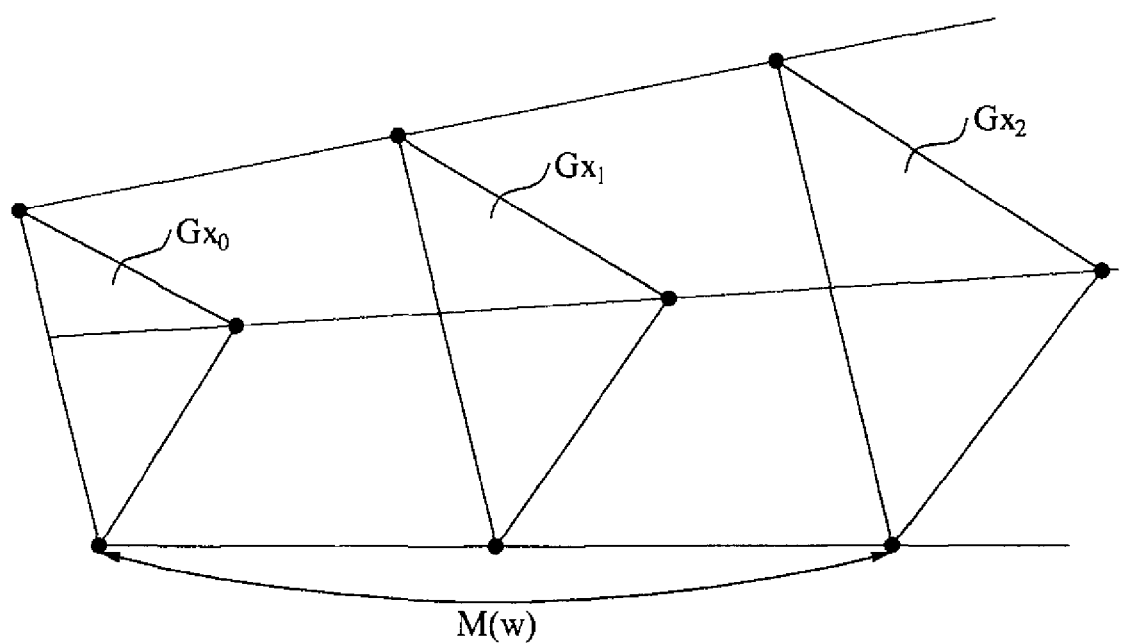
FIG. 3 is a diagram to describe an example of a deformation space defined using the method to create a model of a target organ, in accordance with an illustrative configuration.

FIG. 3 is a diagram to describe an example of a deformation space defined using the method to create a model of a target organ, in accordance with an illustrative configuration. Hereinafter, description will be made based on an example in which liver is used for the target organ. However, embodiments are not limited thereto.

In general, most organs have a characteristic of consistently maintaining volume in terms of shape deformation. The above characteristic is referred to as "volume maintainability". The volume maintainability may be a result from an aspect that 70% of cell composition materials include water. Accordingly, in terms of the shape deformation, the shape of an organ may vary with respect to each of inhalation and exhalation of the patient, whereas an organ volume may be consistently maintained.

Referring to FIG. 3, the shape of liver is minimized at a start point $x_0$ of inhalation and the shape of the liver is maximized at a start point $x_2$ of exhalation. $Gx_0$ indicates a shape model in a case where the shape of the liver is minimized and $Gx_2$ indicates a shape model in a case where the shape of the liver is maximized. The shape deformation of the liver may be variously performed within a deformation space M(w) between the shape models $Gx_0$ and $Gx_2$.

As described above, when the patient inhales and exhales, at least two shape models may be created based on the shape of the liver or other organ, and the deformation space M(w) of the liver or other organ may be defined using the created at least two shape models.

The deformation space M(w) may indicate a space in which shape models of the target organ deform, and may be defined by the deformation matrix G. According to an embodiment, predetermined deformation of an organ of a patient may be maintained by defining a deformation space of a data based shape and by including the organ deformation result in the deformation space. Even though a small number of feature points or noise present in a medical image may occur, robust deformation may be performed because personalized deformation space can compensate for deformation information with respect to portions in which information is absent.

The volume maintainability may be utilized for the non-linear system by adjusting a determinant of a stretching component S of the deformation gradient matrix $T_{ij}$ calculated according to Equation 2.

For example, if D=|S| by calculating a determinant D of a linear interpolated stretching component S, the determinant may be changed to become "1" by changing the stretching component S to be $S'=1/D^{(1/3)}S$.

The determinant D of the deformation gradient matrix $T_{ij}$ indicates a change in volume of a tetrahedron occurring during the deformation process. For example, if D=1, the determinant D indicates that the volume of the tetrahedron is maintained, if D>1, the determinant D indicates that the volume of the tetrahedron increases, and if D<1, the determinant D indicates that the volume of the tetrahedron decreases.

In theory, when polar decomposition of the deformation gradient matrix $T_{ij}$ is performed, the volume of the rotation component $R_{ij}$ does not vary. Accordingly, when a value of the determinant of the stretching component $S_{ij}$ is forced to become "1" by calculating the determinant of the stretching component $S_{ij}$, the volume for each tetrahedron may be maintained, leading to the entire volume maintainability. For the above purpose, when the stretching component is changed to be, for example, $S'=1/D^{(1/3)}S$, the value of the determinant D may become "1".

In addition, due to a matching error and the like, each of tetraheronds that constitute a tetrahedral mesh model may have a different volume. Accordingly, depending on embodiments, a method of initially calculating a determinant of the stretching component $S_{ij}$, obtaining an interpolation value using the input weight w of the tetrahedral mesh, and resealing a determinant of a final stretching component using the interpolation value may be utilized.

Figure 4:
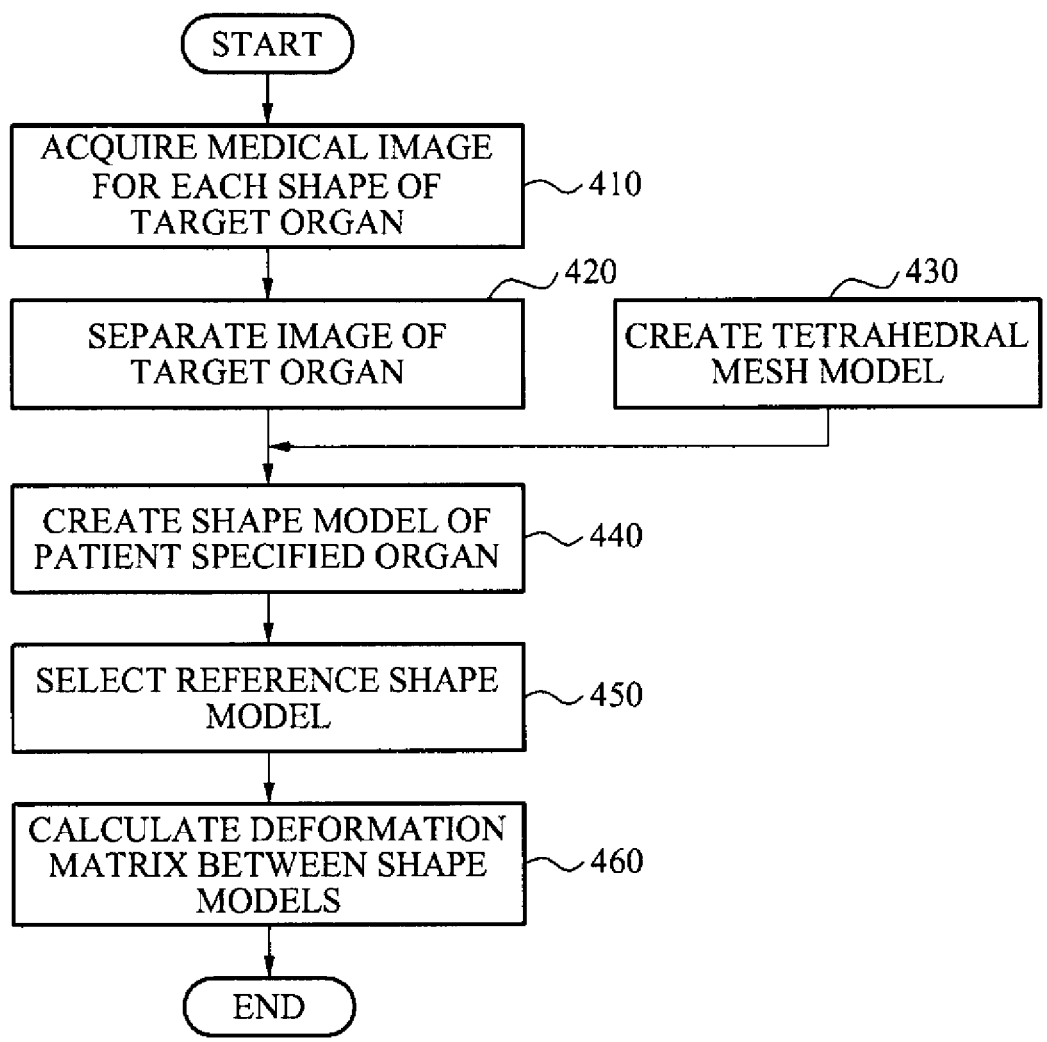
FIG. 4 is a flowchart illustrating a preprocessing process to create a model of a target organ, in accordance with an illustrative configuration.

FIG. 4 is a flowchart illustrating a preprocessing process to create a model of a target organ, in accordance with an illustrative configuration. The operations performed by the method of FIG. 4 may be configured to be performed by the creating apparatus.

Referring to FIG. 4, in 410, the method acquires a medical image for each shape of a target organ of a patient. Here, the medical image may be a medical image in a form of a 3D volume that completely includes the entire shape of the target organ. For example, the medical image may include an MRI image, a CT image, and the like.

The medical image for each shape of the target organ may include heterogeneous images, for example, an MRI image of liver captured in the case of inhalation and a CT image of liver captured in the case of exhalation. Also, the medical image may include homogeneous images, for example, an MRI image of liver captured as the patient inhales and an MRI image of liver captured as the patient exhales. The method of creating a model of a target organ may employ a model based deformation scheme and, thus, may employ the homogeneous medical images and heterogeneous medical images.

The number of medical images for each shape of the patient organ may differ based on a type, mass, and/or volume of the target organ. For example, in the case of an operational characteristic of the target organ, such as liver, lungs, and the like, that may be sufficiently verified by operations performed in inhalation and exhalation, a motion of the target organ may be sufficiently verified using two images captured in the case of inhalation and exhalation, respectively. However, in the case that the target organ is heart, a minimum of four medical images may be required to verify an operation while blood is flowing through a left atrium, a right atrium, a left ventricle, and a right ventricle. Accordingly, in 410, the method acquires a minimum number of medical images needed to verify a deformation characteristic or a operational characteristic of the corresponding target organ.

Figure 5:
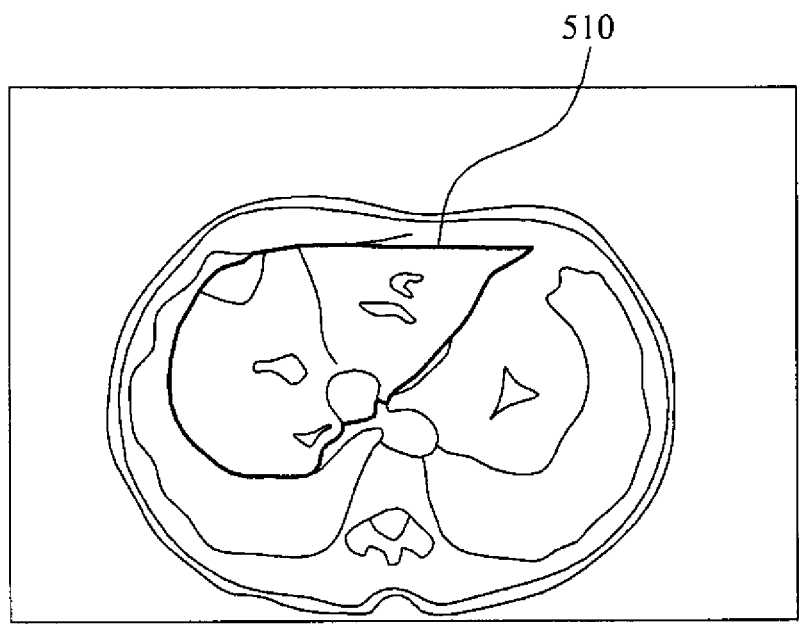
FIG. 5 is an image illustrating an example of a target organ separated in the preprocessing process of FIG. 4, in accordance with an illustrative configuration.

In 420, the method separates an image of the target organ. The method may distinguish the image of the target organ from an image of another area or organ. As shown in FIG. 5, the creating apparatus may separate, that is, distinguish the image of the target organ from an entire medical image by masking an area of the target organ in at least two 3D medical images. Using the area of the target organ masked in 420, in 440, the method may create at least two shape models specified for the target organ of the patient.

In 430, the method applies the diversity of the organ shape of the patient using a tetrahedral mesh model of a preconfigured template organ.

The template organ may be a 3D model provided in a general shape of the corresponding target organ. The template organ may be configured as a tetrahedral mesh as shown in a model illustrated in FIG. 6, and may include a sub-structure of an internal organ such as blood vessels, nerves, and the like as shown in FIG. 7.

In 440, the method creates a shape model of the target organ. In this example, the shape model of the organ may be a tetrahedral mesh model.

In accordance with an illustrative configuration, in 440, the method is a process to create the shape model of the specified target organ by applying an actual organ image of the patient separated in 420, to the tetrahedral mesh model of the template organ of 430. In this example, a complete fit of the tetrahedral mesh model to the organ shape of the patient may be created based on the medical image of the patient and separated organ image information. In 440, the creating apparatus may create the tetrahedral mesh model with respect to at least two organ shapes. Through the above operation, a specific deformation space for a patient may be defined.

In 450, the method selects a reference shape model from among the at least two shape models. For example, the tetrahedral mesh model may be employed as the reference shape model.

In 460, the method calculates a deformation matrix between shape models based on a deformation relationship between the reference shape mode and a remaining shape mode.

Shape models of the organ of the patient may be created by deforming a template mesh. Accordingly, all of the shape models may have the same vertex connectivity. A same vertex connectivity of the shape models may indicate that vertices of the shape models have the same topology connectivity.

For example, a vertex 0 in a shape model created in the case of inhalation corresponds to a vertex 0 in a shape model created in the case of exhalation. In the shape model, as in a case of exhalation, a connectivity relationship may be maintained showing the vertex 0 in the shape model created in the case of inhalation connected to vertices 1 and 3, and the vertices 1 and 3 connected to a vertex 2. Accordingly, corresponding vertices may be verified to be corresponding elements when a vertex number or a vertex index in the target organ is identical to a number or an index of a tetrahedral shape model.

In 460, the method may calculate the deformation relationship between the reference shape model and the remaining shape model based on a deformation gradient of a tetrahedral mesh corresponding to each shape model.

FIG. 5 illustrates an example of a target organ separated in the preprocessing process of FIG. 4, in accordance with an illustrative configuration.

Referring to FIG. 5, a creating apparatus, according to an embodiment, may separate an image of the target organ, for example, liver, from the entire medical image that includes various organs by masking an area 510 of the target organ in given at least two 3D medical images. Masking the area 510 of the target organ may decrease a region of interest (ROI). A process of separating the image of the target organ may correspond to the preprocessing process and be performed through a manual operation, instead of being performed by the creating apparatus.

Figure 6:
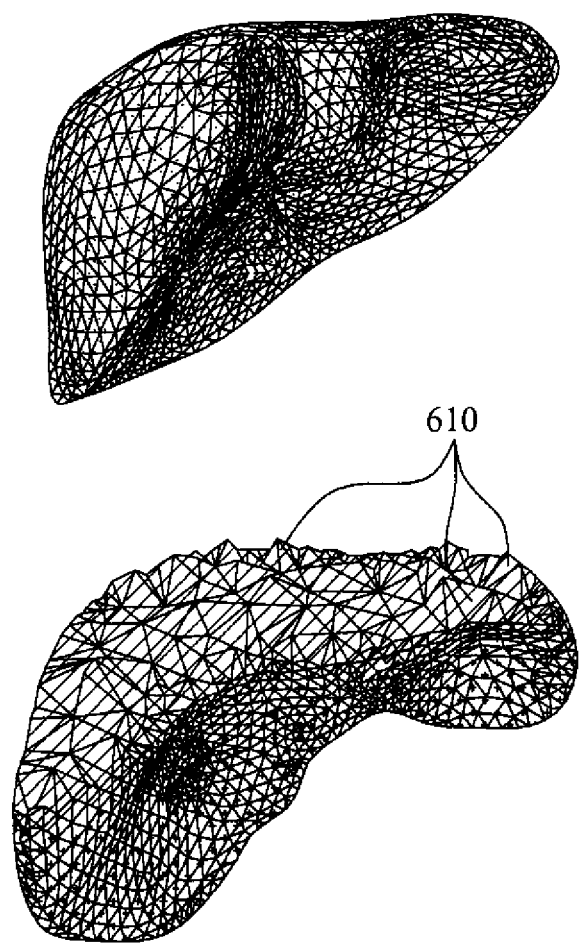
FIG. 6 is an image illustrating an example of a shape model created of a target organ, in accordance with an illustrative configuration.
Figure 7:
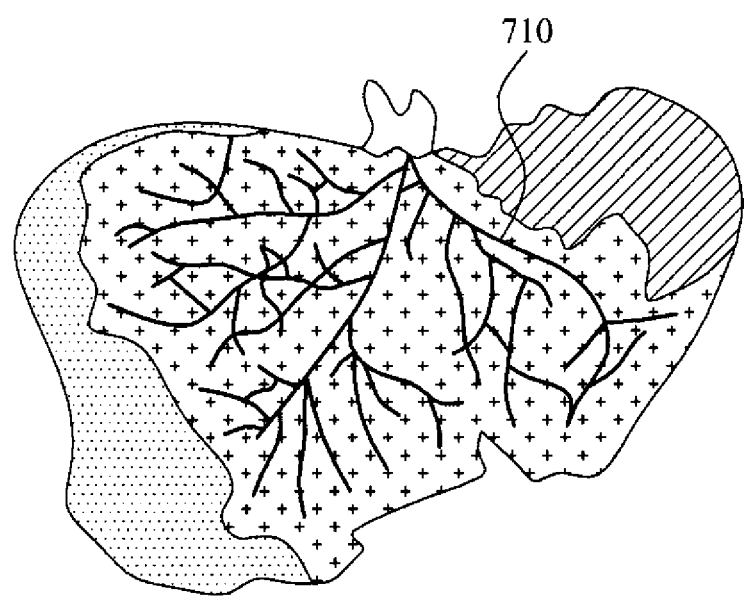
FIG. 7 is an image illustrating an example of a sub-structure included in a shape model of a target organ, in accordance with an illustrative configuration.

FIG. 6 is an image illustrating an example of a shape model created of a target organ, in accordance with an illustrative configuration.

Referring to FIG. 6, a shape model created, according to an embodiment, may be a tetrahedral mesh model completely fitting a shape of an organ of a patient using medical images and separated organ image information. In one example, the tetrahedral mesh model may include a sub-structure of an internal organ such as vessels, nerves, and the like. Each of tetrahedrons 610 that constitute the tetrahedral mesh model may have a different deformation weight.

In one configuration, the deformation weight may indicate a weight to be applied with respect to each of the tetrahedrons 610 that constitute the tetrahedral mesh model so that a model of the target organ may express a deformation characteristic of the actual organ of the patient. A user may determine the deformation weight to be in proportion to stiffness of the actual target organ, or may utilize information, which is verified from an elastography image, about an organ, a tumor, and the like being classified or sensed based on stiffness or elasticity of tissue.

The deformation weight L may have a form expressed in Equation 5:

$$L = \begin{pmatrix} l_1 & & & & & 0 \\ & \ddots & & & & \\ & & l_1 & & & \\ & & & \ddots & & \\ & & & & l_t & \\ 0 & & & & & \ddots \\ & & & & & & l_t \end{pmatrix} \quad \text{(Equation 5)}$$

A nonlinear system in which the deformation weight L is applied to Equation 4 may be expressed by Equation 6:

$$x^*, w^* = \underset{x,w}{\operatorname{argmin}} \|LGx - (M(w) + c)\| \quad \text{(Equation 6)}$$

According to an embodiment, by reflecting a different stiffness according to a position of a target organ or an internal structure based on a deformation weight, internal deformation, volume deformation, and the like of the target organ may be controlled.

FIG. 7 is an image illustrating an example of a sub-structure included in a shape model of a target organ, in accordance with an illustrative configuration.

Referring to FIG. 7, according to an embodiment, an organ shape model may be further represented by including a sub-structure 710 of an internal organ such as vessels, nerves, and the like, in a template organ that includes a tetrahedral mesh model.

Figure 8:
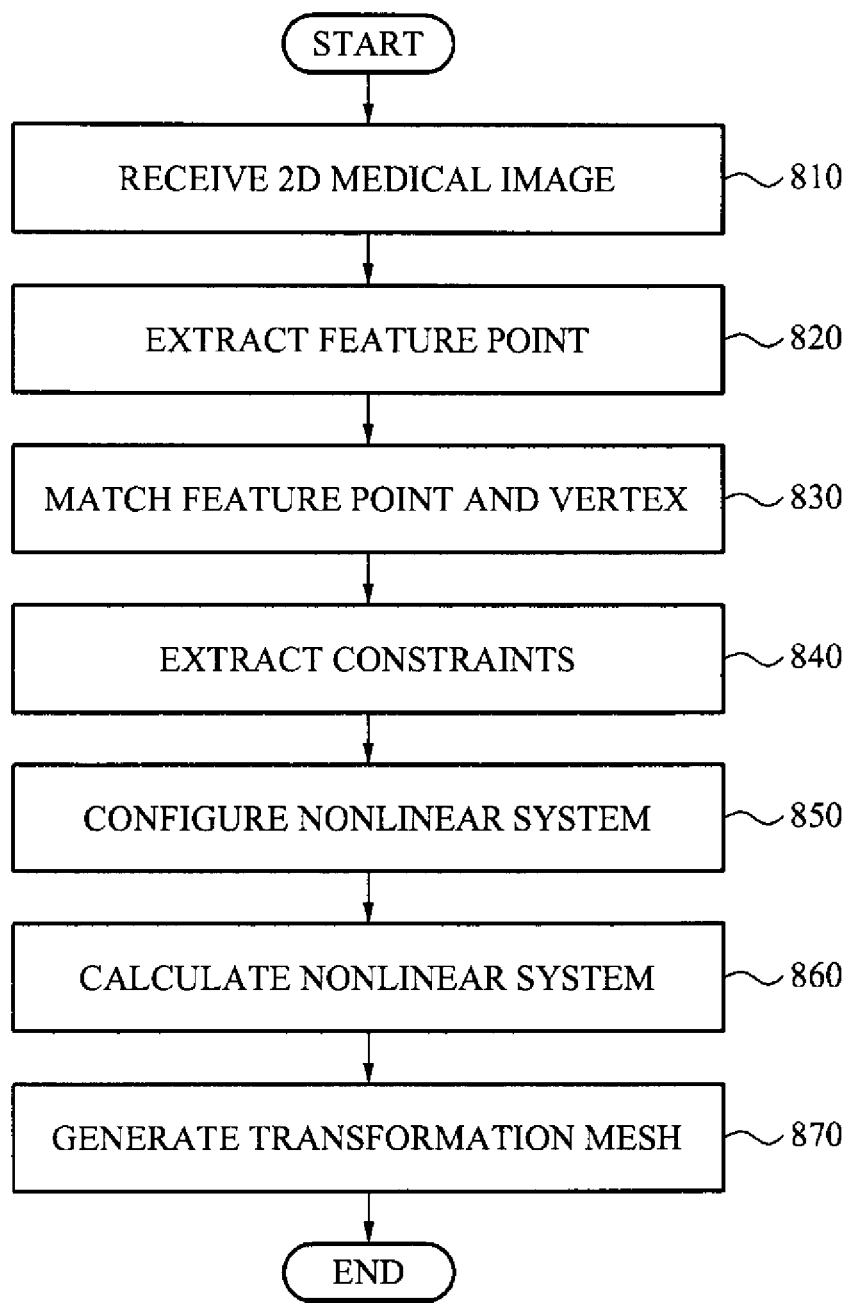
FIG. 8 is a flowchart illustrating an example of a run-time processing process to create a model of a target organ, in accordance with an illustrative configuration.

FIG. 8 is a flowchart illustrating an example of a run-time processing process to create a model of a target organ, in accordance with an illustrative configuration. The operations performed by the method of FIG. 8 may be configured to be performed by the creating apparatus. According to an embodiment, through the run-time processing process, a model of a patient specified target organ, which may be similar to a deformation space formed of shape models of the organ of the patient, is created during the preprocessing process and satisfies constraints input by a user.

Referring to FIG. 8, when a 2D medical image of the target organ of the patient is input in 810, the method extracts a feature point from the 2D image of the target organ in 820.

In 830, the method matches the feature point of the 2D image and a vertex included in 3D images of the target image. The method identifies a number and a position of the vertex corresponding to the feature point of the 2D image from a reference shape model among at least two shape models. The method then matches the feature point of the 2D image and the vertex included in the 3D images of the target organ based on the verified number and position of the vertex.

In 840, the method extracts constraints of the target organ from information input by a user. The extracted constraints may include an index or a number and a position of the vertex.

In 850, the method configures a nonlinear system to create the model of the patient specified target organ. In 860, the method calculates the corresponding nonlinear system.

In one illustrative example, the method may configure the nonlinear system so that deformation gradients of an organ shape model, with respect to a new 2D image, may be similar to a deformation space, which is formed by deformation gradients calculated from the constraints and organ shape models created through the preprocessing process.

In 860, the method calculates a nonlinear system using a parallel algorithm or a graphic processing unit (GPU). The nonlinear system the method configured in 850 is shown Equation 4.

In 860, the method calculates a deformation gradient, which is represented by a feature point of a patient specified target organ, based on the deformation matrix and the constraints. The method calculates a deformation gradient with respect to remaining vertices excluding the vertex corresponding to the feature point of the target organ from among vertices of the 2D image.

Vertices clearly verified as feature points of the target organ from among the vertices of the 2D image may not need to be deformed. As a result, a component associated with the vertices, verified as the feature points, may be changed to be a first value, for example, "0" and only a change value of remaining vertices may be calculated.

In 870, the method generates a deformation mesh of the patient specified target organ, that is, a deformation mesh of a model of the target organ using the calculation result of the nonlinear system.

Figure 9:
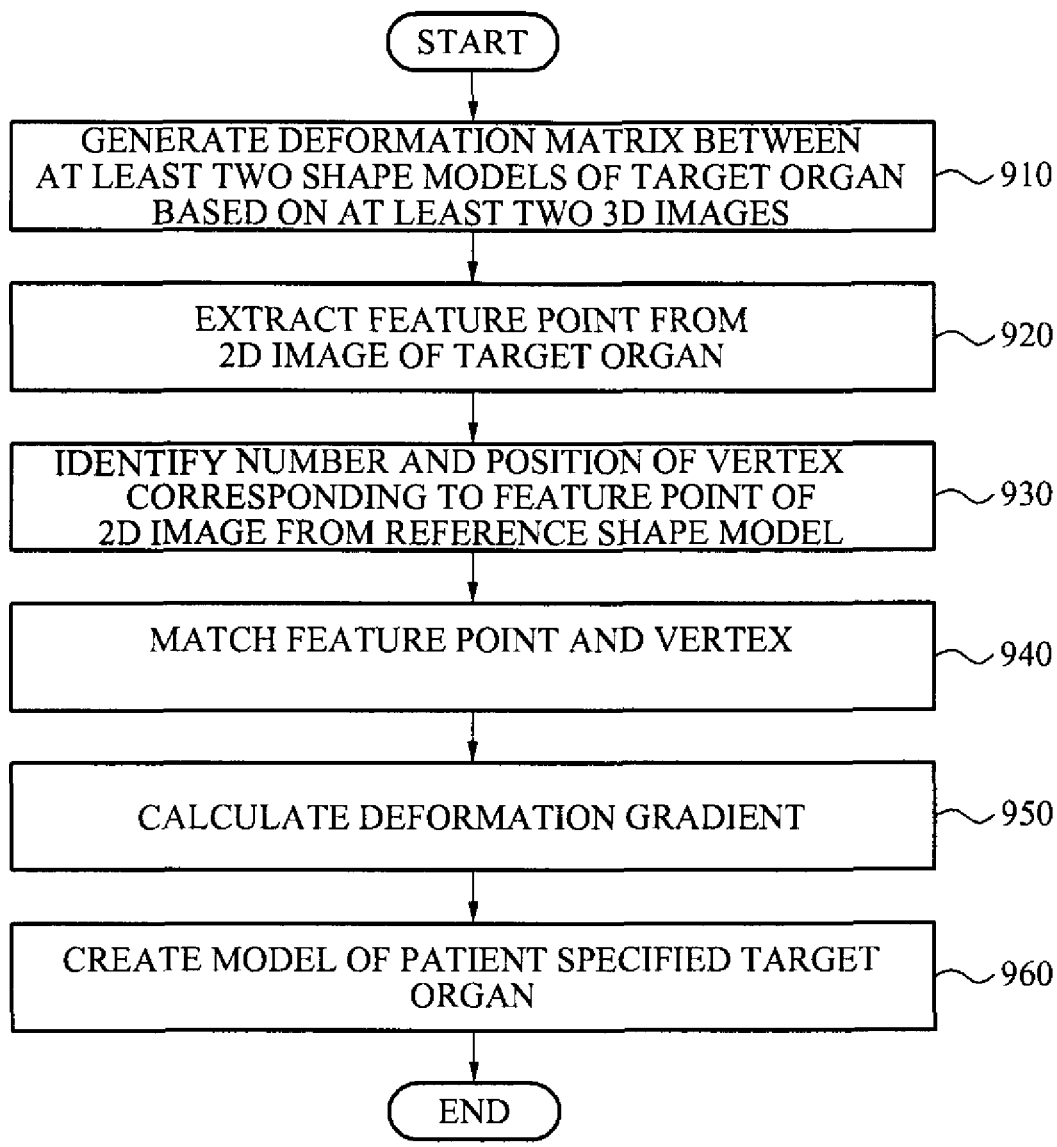
FIG. 9 is a flowchart illustrating another example of a method to create a model of a target organ, in accordance with an illustrative configuration.

FIG. 9 is a flowchart illustrating another example of a method to create a model of a target organ, in accordance with an illustrative configuration. The operations performed by the method of FIG. 9 may be configured to be performed by the creating apparatus.

Referring to FIG. 9, in 910, the method generates a deformation matrix between at least two shape models of a target organ of a patient based on at least two 3D images of the target organ.

The method creates a model of the patient specified target organ based on constraints about the target organ that are extracted from a 2D image of the target organ and the deformation matrix. Hereinafter, a process of creating the model of the patient specified target organ will be further described.

In 920, the method extracts a feature point from the 2D image of the target organ.

In 930, the method identifies a number and a position of a vertex corresponding to the feature point of the 2D image from the reference shape model among the at least two shape models.

In 940, the method matches the feature point of the 2D image and the vertex included in the at least two 3D images of the target organ.

In 950, the method calculates a deformation gradient that is represented by the feature point of the patient specified target organ, based on the deformation matrix and the constraints.

In 960, the method creates the model of the patient specified target organ.

FIG. 10 illustrates an example of an apparatus 1000 to create a model of a target organ, in accordance with an illustrative configuration.

Referring to FIG. 10, the creating apparatus 1000 includes a generating unit 1010, an extracting unit 1030, and a modeling unit 1050.

The generating unit 1010 generates a deformation matrix between at least two shape models of a target organ of a patient based on at least two 3D images of the target organ. The generator 1010 creates shape models based on a shape of the target organ using the at least two 3D images. The deformation matrix between the at least two shape models defines a deformation space that includes the shape models.

In one illustrative example, the at least two shape models may include at least one sub-structure. The at least one sub-structure may include a blood vessel, nerve, and the like.

According to an embodiment, at least two shape models may be included in a tetrahedral mesh model, and each of tetrahedrons that constitute the tetrahedral mesh model may have a different deformation matrix.

The generating unit 1010 includes a masker 1011, a generator 1013, a selector 1015, and a calculator 1017.

The masker 1011 masks an area of the target area in the at least two 3D images.

The generator 1013 creates at least two shape models specified for the target organ of the patient using the masked area of the target organ.

The selector 1015 selects a reference shape model from among the at least two shape models.

The calculator 1017 calculates the deformation matrix based on a deformation relationship between the reference shape model and a remaining shape model. Here, the deformation relationship may be calculated based on a deformation gradient corresponding to each of the reference shape model and the remaining shape model.

The creating apparatus 1000 may further include a decomposition unit (not shown) configured to decompose the deformation gradient into a rotation component and a stretching component through a polar decomposition. Here, an interpolation unit (not shown) may perform a nonlinear interpolation of the rotation component using a matrix exponential function.

Also, the creating apparatus 1000 may further include an adjustment unit (not shown) configured to adjust a determinant of the stretching component in order to maintain a total sum of volumes that are depicted or described by the at least two shape models.

The extracting unit 1030 extracts constraints about the target organ from a 2D image of the target organ.

The extracting unit 1030 includes an extractor 1033 and a matcher 1036.

The extractor 1033 extracts a feature point from the 2D image of the target organ.

The matcher 1036 matches the feature point of the 2D image with a vertex included in the at least two 3D images of the target organ.

The matcher 1036 identifies a number and a position of the vertex corresponding to the feature point of the 2D image from a reference shape model among the at least two shape models. The matcher 1036 also matches the feature point of the 2D image and the vertex based on the number and the position of the vertex.

The modeling unit 1050 creates a model of the target organ specified for the patient based on the constraints and the deformation matrix. Also, the modeling unit 1050 includes a calculator 1053 configured to calculate a deformation gradient that is expressed by the feature point of the target organ specified for the user, and based on the deformation matrix and the constraints.

The calculator 1053 calculates the deformation gradient with respect to remaining vertices excluding a vertex corresponding to the feature point of the target organ from among vertices of the 2D image.

The generating unit 1010, the extracting unit 1030, and the modeling unit 1050 and the various components included in each unit, as illustrated in FIG. 10 and previously described herein, may be implemented using hardware components. For example, the hardware components may include processor, controller, microprocessors, microcontrollers, microphones, amplifiers, band-pass filters, audio to digital convertors, and processing devices. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The methods described above may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums.

The computer readable recording medium may include any data storage device that can store data which can be thereafter read by a computer system or processing device. Examples of the non-transitory computer readable recording medium include read-only memory (ROM), random-access memory (RAM), CD-ROMs, magnetic tapes, floppy disks, optical data storage devices. Also, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein.

As a non-exhaustive illustration only, a device described herein may refer to mobile devices such as a cellular phone, a personal digital assistant (PDA), a digital camera, a portable game console, and an MP3 player, a portable/personal multimedia player (PMP), a handheld e-book, a portable laptop PC, a global positioning system (GPS) navigation, a tablet, a sensor, and devices such as a desktop PC, a high definition television (HDTV), an optical disc player, a setup box, a home appliance, and the like that are capable of wireless communication or network communication consistent with that which is disclosed herein.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of creating a model of a target organ of a patient using a processor, the method comprising:
 receiving at least two three-dimensional (3D) medical images of the target organ, the at least two 3D medical images comprising respective shape models;
 generating a deformation matrix between the at least two shape models of the target organ based on the at least two corresponding 3D images of the target organ;
 extracting constraints about the target organ from a two-dimensional (2D) image of the target organ; and
 preparing the model of the target organ based on the constraints and the deformation matrix for display on a display device,
 wherein the generating comprises:
  selecting a reference shape model from the at least two shape models; and
  calculating the deformation matrix based on a deformation relationship between the reference shape model and a remaining shape model of the at least two shape models.

2. The method of claim 1, wherein the generating comprises:
 masking an area of the target organ in the at least two 3D images; and
 creating the at least two shape models of the target organ using the masked area of the target organ.

3. The method of claim 1, wherein the deformation relationship is calculated based on a deformation gradient corresponding to each of the reference shape model and the remaining shape model.

4. The method of claim 3, further comprising:
 decomposing the deformation gradient into a rotation component and a stretching component through a polar decomposition.

5. The method of claim 4, further comprising:
 performing nonlinear interpolation of the rotation component using a matrix exponential function.

6. The method of claim 4, further comprising:
 adjusting a determinant of the stretching component to maintain a total sum of volumes that are depicted by the at least two shape models.

7. The method of claim 1, further comprising:
 configuring the at least two shape models to comprise a sub-structure of the target organ, and
 the sub-structure comprises a blood vessel and a nerve.

8. The method of claim 1, further comprising:
 configuring a tetrahedral mesh model to comprise the at least two shape models, wherein
 each tetrahedron of the tetrahedral mesh model has a different deformation weight.

9. The method of claim 1, wherein the extracting comprises:
 extracting a feature point from the 2D image of the target organ; and
 matching the feature point of the 2D image and a vertex comprised in the at least two 3D images of the target organ.

10. The method of claim 9, wherein the matching comprises:
 identifying a number and a position of the vertex corresponding to the feature point of the 2D image from a reference shape model of the at least two shape models; and
 matching the feature point of the 2D image and the vertex based on the number and the position of the vertex.

11. The method of claim 10, wherein the creating comprises:
calculating a deformation gradient that is depicted by the feature point of the target organ based on the deformation matrix and the constraints.

12. The method of claim 11, wherein the calculating comprises:
calculating the deformation gradient with respect to remaining vertices excluding a vertex corresponding to the feature point of the target organ from vertices of the 2D image.

13. A non-transitory computer-readable medium comprising a program for instructing a computer to perform the method of claim 1.

14. An apparatus for creating a model of a target organ of a patient, the apparatus comprising:
a processor, including:
a receiver configured to receive at least at least two three-dimensional (3D) medical images of the target organ, the at least two 3D medical images comprising respective shape models:
a generator configured to generate a deformation matrix between the at least two shape models of the target organ based on at the least two corresponding three-dimensional (3D) images of the target organ;
an extractor configured to extract constraints about the target organ from a two-dimensional (2D) image of the target organ; and
a modeler configured to prepare the model of the target organ based on the constraints and the deformation matrix for display on a display device, wherein the generator comprises:
a selector configured to select the reference shape model from the at least two shape models; and
a calculator configured to calculate the deformation matrix based on a deformation relationship between the reference shape model and a remaining shape model of the at least two shape models.

15. The apparatus of claim 14, wherein the generator comprises:
a masker configured to mask an area of the target organ in the at least two 3D images; and
a generator configured to create the at least two shape models of the target organ using the masked area of the target organ.

16. The apparatus of claim 15, wherein the deformation relationship is calculated based on a deformation gradient corresponding to each of the reference shape model and the remaining shape model.

17. The apparatus of claim 16, further comprising:
a decomposer configured to decompose the deformation gradient into a rotation component and a stretching component through a polar decomposition.

18. The apparatus of claim 17, further comprising:
an interpolator configured to perform nonlinear interpolation of the rotation component using a matrix exponential function.

19. The apparatus of claim 17, further comprising:
an adjuster configured to adjust a determinant of the stretching component in order to maintain a total sum of volumes that are depicted by the at least two shape models.

20. The apparatus of claim 14, wherein
the at least two shape models comprise a sub-structure of the target organ, and
the sub-structure comprises a blood vessel and a nerve.

21. The apparatus of claim 14, wherein
the at least two shape models are comprised in a tetrahedral mesh model, and
each tetrahedron of the tetrahedral mesh model has a different deformation weight.

22. The apparatus of claim 14, wherein the extractor comprises:
an extractor configured to extract a feature point from the 2D image of the target organ; and
a matcher configured to match the feature point of the 2D image and a vertex comprised in the at least two 3D images of the target organ.

23. The apparatus of claim 22, wherein the matcher is configured to identify a number and a position of the vertex corresponding to the feature point of the 2D image from the reference shape model of the two shape models, and to match the feature point of the 2D image and the vertex based on the number and the position of the vertex.

24. The apparatus of claim 23, wherein the modeler comprises:
a calculator configured to calculate a deformation gradient that is depicted by the feature point of the target organ based on the deformation matrix and the constraints.

25. The apparatus of claim 24, wherein the calculator is configured to calculate the deformation gradient with respect to remaining vertices, excluding a vertex corresponding to the feature point of the target organ from vertices of the 2D image.

* * * * *